United States Patent Office 2,694,596
Patented Nov. 16, 1954

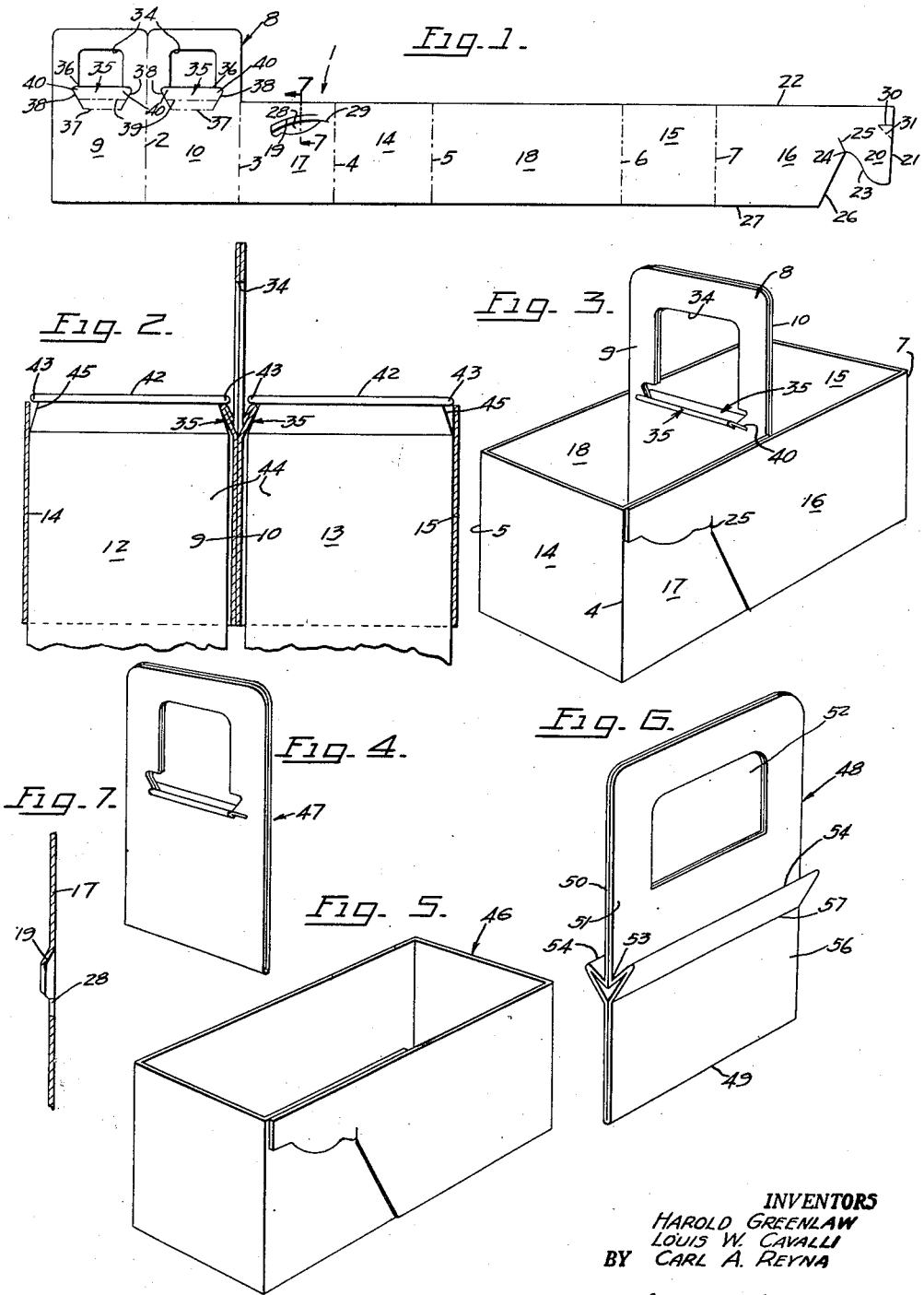

2,694,596

CARTON CARRIER

Harold Greenlaw, Oakland, and Louis W. Cavalli and Carl A. Reyna, San Francisco, Calif., assignors to Edlo, Inc., San Francisco, Calif., a corporation of California Original application March 27, 1951, Serial No. 217,820. Divided and this application February 3, 1953, Serial No. 334,858

7 Claims. (Cl. 294—87.2)

This invention relates to a carton carrier of generally the type shown in copending application for Letters Patent Serial No. 198,938, filed December 4, 1950, and has for one of its objects a simple economically made and assembled carrier for rectangular cartons of the type commonly used for containing milk.

This application is a division of application for Letters Patent, Serial No. 217,820, filed March 27, 1951, by Samuel Platt and Louis W. Cavalli.

Heretofore milk cartons having a gablelike or "roof" top have been made in half gallon sizes for milk, but the cartons having flat tops have been made only in quart sizes and smaller due to manufacturing considerations. The present invention provides a sufficiently economical holder and carrier for two quart cartons to meet the demand for half gallon quantities of milk without resorting to a single half gallon container. Even purchasers of milk in gallon quantities usually prefer getting it in quart sizes that will remain sealed until actually required.

Carton carriers and holders for supplying the above demand must of necessity be economical to make and to apply to the cartons where, as in most instances, the cost of the milk is no more than were it supplied in half gallon containers. The present invention provides a carrier that is strong, easy and economical to make from a structural standpoint and from the standpoint of material, and which carrier is easy and economical to apply to the cartons.

Other objects and advantages will appear in the description and in the drawings.

In the drawings,

Fig. 1 is a reduced size view of a blank that is adapted to be folded to form a carrier, and which blank includes all the elements of the holder in one piece.

Fig. 2 is a vertical sectional view taken through the carrier with the upper ends of the cartons shown in place in said carrier.

Fig. 3 is a perspective view of the blank of Fig. 1 in set-up position.

Fig. 4 is a perspective view of the handle portion of the carrier as a unit separate from the collar that is adapted to surround the cartons.

Fig. 5 is a perspective view of a collar separate from the handle of Fig. 4, but which is for use with said handle.

Fig. 6 is a perspective view of a modified form of the invention that differs somewhat from the form shown in Fig. 4, but which form is adapted for use with the collar of Fig. 5.

Fig. 7 is an enlarged sectional view on line 7—7 of Fig. 1.

In the drawings, referring to Fig. 1, the carrier comprises a blank 1 of cardboard or the like that is in the form of an elongated strip of uniform width except at its end portions. This strip is formed with spaced parallel transverse folding creases 2, 3, 4, 5, 6, 7 that are at right angles to the length of the strip, and which creases, as seen in Fig. 1, are in succession starting from the left.

The crease 3, which is second from the left, defines the connection between the left hand end portion 8 of the strip, and is substantially wider than the strip, although the bottom edges of said strip and said portion are in alignment.

This portion 8 of the carrier forms the handle, and the folding crease 2 centrally bisects the same so that the halves 9, 10 at opposite sides of the crease 2 may be folded on themselves. The half 9 is at the extreme end of the strip.

The remainder of the strip (excluding portion 17) is adapted to be folded along folding creases 4, 5, 6, 7 to form a horizontally elongated rectangular collar adapted to extend around two vertically disposed conventional, rectangular milk cartons (Fig. 2) adjacent the tops of the latter.

The ends of said collar comprise the sections 14, 15 of the strip that respectively lie between folding creases 4, 5 and 6, 7.

The section 17 that lies between folding creases 3, 4 forms one half of one side of the collar, and the right hand half of the right hand end section 16 that is at the right hand end of the strip is adapted to overlie the section 17 when the collar is formed. Thus sections 16, 17 together, form one side of the collar, and the side opposite thereto is the section 18 that lies between folding creases 5, 6.

The horizontal widths of the halves 9, 10 of the handle portion 8 are each substantially equal to the width of either end 14, 15 of the collar.

In setting up the carrier, the left hand half 9 of the handle portion is first folded over (toward the observer looking at Fig. 1) onto the half 10. Then the sections 17, 14, 18, 15, 16 are folded along folding creases 4, 5, 6, 7 to form the rectangular collar as above described, and finally the handle portion is swung about the folding crease 3 to a position extending across the collar midway between the sides and at right angles to the latter. Thus a pair of rectangular openings each adapted to receive the upper portion of a rectangular milk carton therein such as 12, 13, are provided at opposite sides of the handle portion 8, which portion forms the partition between said openings.

The outer end of the end section 16 is cut away along the lower edge of the strip and upwardly at a point spaced from the outer end edge of said section to form a downwardly projecting locking tab 20. The end edge 21 of the strip (free end edge of section 16) is inclined slightly relative to the upper edge 22 of the strip, and section 16 to form a slightly acute angle with said edge 22. The lower part of this edge 21 is also the laterally outer edge of the tab 20.

Tab 20 is more or less pointed in a downward direction having a slightly sinuously extending inner edge 23 that connects with edge 21 at its lower end so that the lower end edge of the tab is rounded. This edge 23 extends generally divergently upwardly from its connection with edge 21 to a point 24 about half the distance between the lower end of tab 20 and the upper edge 22 of the strip.

From said point 24 a short slit 25 continues generally upwardly, and also from point 24, the end edge 26 of the strip below tab 20 extends divergently downwardly to the lower edge 27 of the strip.

The section 17 is formed with horizontally extending opening 28 for the tab 20. When the section 16 is swung to overlie section 17, the tab 20 is thrust downwardly into opening 28 and is easily locked with section 17. A slit 29 is in continuation of one end of the opening 28. Along the upper edge of opening 28 the material is bent to one side of section 17 as indicated at 19 (Fig. 7) to facilitate entry of tab 20 into the opening 28 at the other side of said section.

Spaced above the tab 20 is a short slit 30 that extends from the free outer end edge of the strip into the strip longitudinally thereof, and a downwardly inclined folding crease 31 extends from the inner end of said slit to said free edge. When the tab 20 is thrust into the opening 28 for its full length, the slit 30 will pass across slit 29 and the portion of the strip below slit 30 and above folding crease 31 will tend to snap to one side below slit 29 so as to effectively preclude withdrawal of the tab from opening 28.

In handle 8, the halves 9, 10 projects a substantial distance above the upper edge 22. The portions so projecting are formed with registering finger openings 34 through which fingers of a hand may be passed for carrying the cartons that are held within the collar.

Below the openings 34, said halves 9, 10 are formed with partially cut out horizontally elongated members generally designated 35 that also are in registration insofar as their outlines are concerned when the halves are together.

The upper edge 36 of each member 35 defines the lower edge of each opening 34 and said edge is spaced above a line in straight continuation of the upper edge of the strip that consists of the sections 17, 14, 18, 15 and 16. The lower edge of each member 35 is defined by a folding crease 37 that is parallel with the edge 36 and that is spaced slightly below said line that is in continuation of the upper edge of the above named sections.

The ends of the edge 36 and the crease 37 in each half 9, 10 are connected by convergently downwardly extending slits 38, and a central folding crease 39 is midway between edge 36 and crease 37 and parallel therewith, said crease 39 being substantially in axial alignment with the upper edges of sections 14 to 18.

Before the halves 9, 10 are folded on themselves in making the carrier, the said members 35 are bent oppositely outwardly of the said halves along creases 37 and in direction away from each other when the halves are together, and then the upper halves of each of said members are folded back over the lower half so that the corners 40 of the upper portion of each member 35, above crease 39 will overlap the body of members 9, 10 respectively adjacent the ends of the lower folding crease 37, thereby positively holding the said members 35 in planes extending divergently upwardly from the planes in which the halves 9, 10 are positioned. The upper edges of said members 35 are along the folding creases 39 when said members are folded on themselves, as described and said edges are relatively long extending the major part of the distance between the sides of the collar. Also said upper edges are preferably substantially even with the upper edges of the collar.

Cartons 12, 13 are identical, and each has a substantially square top 42 (in plan view) with a flange 43 along each edge.

The sides 44 of each carton are usually in substantially the same plane as the edge of the top at the upper end of each side, there being a laterally outwardly opening recess 45 just below the top, the upper side of which is the lower side of each flange 43.

In assembling the cartons, the collar may first be formed, and then slipped downwardly over an adjacent pair with the lower parts of the handle 14 disposed betweeen said cartons. As the members 35 (which have been previously folded on themselves) pass the adjacent flanges 43 of the pair of cartons, they are yieldably urged toward each other and then as they clear the flanges 43 they snap oppositely outwardly and below said adjacent flanges. By this time the upper edge of the collar is about flush with the upper surfaces of the tops of said cartons, although it is preferably slightly below the level of said surfaces. Inasmuch as the collar makes a relatively snug fit around said cartons, just permitting the members 35 to pass the adjacent flanges 43, the carrier cannot be pulled away from the cartons, and a person may safely and conveniently carry a pair of cartons by handle 40.

In the form of the invention as shown in Figs. 4, 5, the handle 47 is identical with the handle 40, except that there is no strip secured thereto, and the collar 46 of Fig. 5 is identical with the collar of Fig. 3 except that no handle portion is secured thereto.

In operation the collar 46 is first formed as described for the collar of Figs. 1 to 3, and is then slipped over the upper portions of a pair of cartons, after which the handle 46 is inserted between the cartons.

In some arrangements, the collar and handle fit into the assembly operation easier than where the handle is part of the collar, and vice versa. The advantage of the handle and collar being in one piece is the fact that the collar cannot possibly slip down on the carton and away from the handle, but as the collar makes a close fit with the cartons, there is little likelihood of this occurring.

In the form of invention shown in Fig. 6, the handle only is different from that shown in Fig. 4. The same collar as shown in Fig. 5 is used. Said handle is generally designated 48 and comprises an elongated strip of cardboard that is folded on itself intermediate its ends so that the line of fold 49 is the lower edge of the handle and halves 50, 51 are above said line.

Registering openings 52 are formed in the upper ends of the overlying halves and parallel folding creases at 53, 54 spaced below said openings in each half extend transversely across the strip that forms the handle and are parallel with crease 49. These creases 53, 54 are respectively identically spaced in each half from the central folding crease 49 so that the portion between creases 53, 54 and below creases 54 in each half may be folded on themselves and when so folded will form oppositely outwardly and divergently upwardly extending members that will engage under the adjacent flanges 43 of a pair of cartons 12, 13 when used in the manner described for the handle of Fig. 5 or that of Fig. 2.

The doubled over sections forming the portions of each handle that engages under the adjacent flanges in all of the forms of the invention engage said flange along a finished folding crease. This is preferable to depending upon a raw edge of cardboard for such engagement since such raw edges are relatively weak and are subject to being torn or frayed.

In Figs. 2, 4 a positive means in the form of the corners 40 yieldably urges the flange engaging members oppositely outwardly, and the inherent resiliency of the cardboard itself at the fold lines is not solely relied upon. In the form of invention as seen in Fig. 6, the lower portion 56 below crease 54 will engage between the adjacent sides of cartons 12, 13 and when the handle is thrust between said cartons until said folded over sections along the edges formed by creases 54 is below the adjacent flanges, any attempt to pull the handle out of between said cartons will immediately pull the doubled over flange engaging sections outwardly and below said flanges. Thus a means is provided in this form of invention for causing said flange engaging sections to move to below the adjacent flanges.

If desired, a folding crease may be formed along lines 57 (Fig. 6) that are parallel with the creases 53, 54. The operation of the handle will be substantially the same in any event. It may also be noted that in the invention as seen in Fig. 6 the flange engaging portions tend at all times to yieldably spring outwardly so as to engage below the flanges 43 due to each of said portions being folded on themselves.

While it has been mentioned that the collars of Fig. 3 and Fig. 4 may be formed and thereafter slipped over the cartons, it is to be understood that, insofar as this invention is concerned, any suitable method of applying the holder to the cartons may be employed.

The fact that the members 35 that are adapted to engage below the upper flanges on the cartons also define the lower edges of the finger openings 34 enables the said members to be easily folded on themselves to carton engaging positions by hand or by machinery inasmuch as ready access is had thereto by reason of said openings 34.

We claim:

1. A carrier for a pair of vertically elongated rectangular cartons of corresponding shape and size each having a rectangular top and laterally directed flanges along the edges of said top comprising; a horizontally disposed rectangular collar adapted to extend around said cartons below their upper ends for holding them together with one of their flat sides in opposed relationship, a substantially rectangular sheet folded on itself to provide a virtually elongated substantially rectangular member adapted to extend between the longer pair of opposed sides of said collar and between and above the adjacent flanges along the upper ends of said flat sides when said cartons are within said collar, registering hand openings formed in the portions of said sheet adapted to extend above said adjacent flanges and corresponding sections of the sides of said sheet below said openings doubled on themselves and projecting laterally outwardly and divergently upwardly for engaging below said flanges.

2. A carrier for a pair of vertically elongated rectangular cartons of corresponding shape and size each having a rectangular top and laterally directed flanges along the edges of said top comprising; a horizontally disposed rectangular collar adapted to extend around said cartons below their upper ends for holding them together with one of their flat sides in opposed relationship; a substantially rectangular sheet folded on itself to provide a virtually elongated substantially rectangular member adapted to extend between the longer pair of opposed sides of said collar and between and above the adjacent flanges along the upper ends of said flat sides when said cartons are within said collar, registering hand openings formed in the portions of said sheet adapted to extend above said adjacent flanges and corresponding sections of the sides of said sheet below said openings doubled on themselves and projecting laterally outwardly and divergently upwardly for engaging below said flanges, said collar being relatively wide so as to extend over a substantial portion of the outer sides of the cartons of said pair and said member having a substantial portion below said sections for extending between the opposed sides of said pair of cartons.

3. In a carrier for a pair of vertically elongated rectangular cartons of corresponding shape and size having rectangular tops and laterally directed flanges along the edges of said tops, a rectangular collar adapted to extend around said pair for holding them together, a sheet of cardboard folded on itself to provide a flat vertically elongated flat member consisting of a pair of correspondingly shaped layers of said cardboard adapted to extend between and above the adjacent flanges along said tops when said cartons are within said collar, registering hand openings formed in said layers at the upper end of said member and a portion of each layer below said openings being folded on themselves to provide horizontally elongated divergently extending sections having upwardly and oppositely outwardly directed straight, horizontally extending edges adapted to engage below said adjacent flanges.

4. A carrier for a pair of vertically disposed rectangular cartons of corresponding shape and size each having laterally directed flanges at its upper end comprising; a collar adapted to extend around said cartons for holding them together with one of their flat sides in opposed relation, a pair of vertical cardboard sheets of similar shape and size in face to face engaging relationship adapted to extend between and above the adjacent flanges at the top of said cartons when they are within said collar, registering hand openings formed in the portions of said sheets adapted to extend above said cartons when they are held together, corresponding horizontally elongated sections integral with said sheets respectively along a straight horizontal line extending horizontally the major distance between the side edges of said sheets and cut from said sheets along three sides above said lines to provide similar horizontally elongated sections secured to said sheets only along said lines, each of said sections being folded on itself along a straight line about midway of the vertical width of each section providing a straight edge along the line of fold and the sections so folded being bent oppositely outwardly for engagement of said straight edge of each section below said adjacent flanges.

5. A carrier for a pair of vertically elongated rectangular cartons of corresponding shape and size each having a rectangular top and laterally directed flanges along the edges of said top comprising; a collar adapted to extend around said pair below said flanges for holding them together with one of their flat sides in opposed relation, a pair of rectangular sheets of cardboard in face to face engaging relation adapted to extend between and above the adjacent flanges of said cartons when the latter are within said collar, registering hand openings formed in the portions of said sheets that are adapted to extend above said flanges, corresponding horizontally elongated sections in said sheets each cut away from its sheet along a pair of horizontally spaced divergently upwardly extending lines and along a straight line extending between the divergent upper ends of said pair of lines, the upper halves of said sections being folded toward each other and on the lower halves respectively whereby the upper corners of said sections before folding will overlie the opposite outer section of said sheets at the convergent ends of said lines for holding said folded sections inclined oppositely outwardly for extending beneath said adjacent flanges.

6. A carrier for a pair of vertically elongated rectangular cartons of corresponding shape and size each having a rectangular top and laterally directed flanges along the edges of said top comprising; a collar adapted to extend around said pair below said flanges for holding them together with one of their flat sides in opposed relation, a pair of rectangular sheets of cardboard in face to face engaging relation adapted to extend between and above the adjacent flanges of said cartons when the latter are within said collar, registering hand openings formed in the portions of said sheets that are adapted to extend above said flanges, corresponding horizontally elongated sections in said sheets each cut away from its sheet along a pair of horizontally spaced divergently upwardly extending lines and along a straight line extending between the divergent upper ends of said pair of lines, the upper halves of said sections being folded toward each other and on the lower halves respectively whereby the upper corners of said sections before folding will overlie the opposite outer section of said sheets at the convergent ends of said lines for holding said folded sections inclined oppositely outwardly for extending beneath said adjacent flanges, said sheets being integrally joined along one of their vertical edges and said collar being integrally joined with one of said sheets along one of the vertical edges of the latter.

7. In a carton carrier for a pair of vertically elongated rectangular cartons of corresponding shape and size in side by side relationship having parallel adjacent flanges along their upper edges; a pair of vertically disposed, correspondingly shaped vertically elongated cardboard sheets in opposed face to face relationship adapted to be positioned between said cartons in a position projecting upwardly therefrom, registering finger openings in the portions of said sheets adapted to project upwardly from said cartons when said sheets are between said pair of cartons, and members integral with said sheets and defining the lower edges of said openings foldable on themselves to positions extending divergently outwardly and upwardly for engagement between said adjacent flanges on said cartons, and a collar adapted to extend around such pair of cartons for holding them together.

No references cited.